United States Patent [19]
Govoni et al.

[11] Patent Number: 5,728,353
[45] Date of Patent: Mar. 17, 1998

[54] PROCESS AND APPARATUS FOR THE GAS-PHASE POLYMERIZATION OF OLEFINS

[75] Inventors: Gabriele Govoni, Renazzo; Roberto Rinaldi, Mantova; Massimo Covezzi, Ferrara, all of Italy

[73] Assignee: Montell North America Inc., Wilmington, Del.

[21] Appl. No.: 711,133

[22] Filed: Sep. 9, 1996

Related U.S. Application Data

[62] Division of Ser. No. 619,455, Mar. 20, 1996, abandoned, which is a division of Ser. No. 469,732, Apr. 6, 1995, abandoned, which is a division of Ser. No. 315,669, Sep. 30, 1994, abandoned, which is a continuation of Ser. No. 76,329, Jun. 14, 1993, abandoned.

[30] Foreign Application Priority Data

Jun. 18, 1992 [IT] Italy ................................ MI92A1496
Jun. 18, 1992 [IT] Italy ................................ MI92A1499

[51] Int. Cl.⁶ .................................................. F27B 15/08
[52] U.S. Cl. ........................ 422/145; 422/131; 422/140; 422/189; 422/234; 422/235; 525/53; 526/65; 526/904
[58] Field of Search .......................... 422/131, 140, 422/142, 145, 188, 189, 234, 235; 525/53, 54; 526/65, 901, 904, 905

[56] References Cited

U.S. PATENT DOCUMENTS

| | | | |
|---|---|---|---|
| 4,098,974 | 7/1978 | Klaassen | 526/65 |
| 4,113,440 | 9/1978 | Klaasen | 422/132 |
| 4,218,339 | 8/1980 | Zucchini et al. | |
| 4,302,566 | 11/1981 | Karol et al. | |
| 4,399,054 | 8/1983 | Ferraris et al. | |
| 4,472,520 | 9/1984 | Zucchini et al. | |
| 4,703,094 | 10/1987 | Raufast | 526/65 |
| 4,748,221 | 5/1988 | Collomb et al. | |
| 5,087,522 | 2/1992 | Bailly et al. | 428/402 |
| 5,139,985 | 8/1992 | Barbe' et al. | |

FOREIGN PATENT DOCUMENTS

| | | |
|---|---|---|
| 1032945 | 3/1964 | European Pat. Off. |
| 0077532 | 10/1982 | European Pat. Off. |
| 0373660 | 12/1989 | European Pat. Off. |
| 0400333 | 4/1990 | European Pat. Off. |
| 0449673 | 2/1991 | European Pat. Off. |

*Primary Examiner*—Christopher Kim

[57] ABSTRACT

Gas-phase process for the preparation of polymers and copolymers of olefins $CH_2=CHR$, carried out in at least 2 fluidized or mechanically agitated bed gas-phase reactors operating under different reaction conditions so as to obtain different polymers in the different reactors; the process is characterized in that the polymer is at least partially recycled among the different reactors by using ratios of the flow rate of circulation among the different reactors to the discharge flow rate comprised between 2 and 6.

10 Claims, 4 Drawing Sheets

PROCESS AND APPARATUS FOR THE GAS-PHASE POLYMERIZATION OF OLEFINS

This application is a division of application Ser. No. 08/619,455 filed Mar. 20, 1996, abandoned, which is a division of application Ser. No. 08/469,732, Jun. 6, 1995, abandoned, which is a division of application Ser. No. 08/315,669, Sep. 30, 1994, abandoned, which is a continuation of Ser. No. 08/076,329, Jun. 14, 1993, abandoned.

The present invention relates to a gas-phase process for the production of polymers or copolymers of olefins $CH_2=CHR$, wherein R is hydrogen or an alkyl radical containing 1-12 carbon atoms, carried out in at least two fluidized or mechanically agitated bed gas-phase reactors operating under different reaction conditions and comprising the recycle of the polymer between the reactors.

According to a preferred embodiment, the present invention relates also to a continuous gas-phase process for the production of broad molecular weight distribution (MWD) polymers or copolymers of said olefins $CH_2=CHR$, carried out in at least two fluidized or mechanically agitated bed gas-phase reactors operating under reaction conditions which differ at least by the concentration of molecular weight regulators, and comprising the recycling of the polymer between the reactors and further comprising packing and washing the polymer with a suitable gas at the outlet of at least one reactor.

Technologies for the production of olefins based on multistage or multiple reactor processes wherein the various reactors can operate continuously under different polymerization conditions are of particular industrial interest. The possibility of independently varying in each stage/reactor process parameters such as temperature, pressure, nature of the catalyst, type and concentration of the monomers, concentration of hydrogen or other molecular weight regulator, allows a much wider flexibility in the control of the composition and properties of the final product than for single-stage processes.

In particular, multistage processes can be used for controlling the molecular weight distribution (MWD) of polyolefins. MWD influences both the rheological behaviour and therefore the processability of the melt, and the final mechanical properties, and it is a particularly important characteristic for ethylene (co)polymers. Broad MWD polyolefins therefore possess better balanced processability and mechanical characteristics than polymers having a narrower MWD. Polyolefins having a broad MWD, coupled to relatively high average molecular weights, are particularly preferred in high-speed extrusion processing and in blow-molding, conditions where narrow MWDs might result in melt fracture.

It is known that broad MWDs can be obtained by multistage processes based on producing polymer fractions of different molecular weights in the different stages, that is by sequentially forming macromolecules of different length onto the catalyst particles. Controlling the molecular weight obtained in each stage can be accomplished by different methods, for example by suitably selecting polymerization conditions or the catalyst system in each stage, or by using a molecular weight regulator. Regulation by hydrogen is the preferred method when operating either in the liquid or in the gas phase.

The relative amounts of the low and high molecular weight fractions are controlled through the residence times or the monomer concentration in the various stages, and they determine the average molecular weight and the width of the MWD of the final product.

With regard to the polymers of ethylene, the width of the molecular weight distribution is generally expressed in terms of the melt flow ratio F/E, which is the ratio of the melt index measured with a load of 21.6 kg (melt index F) to that measured with a load of 2.16 kg (melt index E). Melt index measurements are carried out at 190° C. according to ASTM D-1238. Typically, the melt index E is used as an indicative measure of the average molecular weight.

Processes comprising more than one reactor in series for the production of broad MWD polyolefins are known, both for polymerizations carried out in the liquid phase (solvent or liquid monomer) and for polymerizations in the gas phase.

A problem typically encountered in processes of this type is that of yielding insufficiently homogeneous products, especially in the case of very broad molecular weight distributions. Limited homogeneity leads to certain drawbacks during processing because of the different rheological behaviour of the low molecular weight and the high molecular weight polymer fractions which are present in each single polymer particle. Non-homogeneous materials are evident during processing when the molecular weights produced in each reactor are very different, that is, when a process for producing very broad molecular weight distributions is used.

The degree of homogeneity influences the properties of the polymer and the possible fields of application of the finished product. Particularly critical is the homogeneity of the material used in blow molding processes and in the production of thin films, where the presence of even small amounts of non-homogeneous material is manifested by the presence of unmelted particles.

As a matter of fact, it has to be noted that in the polymerization of olefins carried out by using Ziegler-Natta catalysts the actual place where the reaction takes place is the catalyst granule onto which the polymer grows; each catalyst granule can be considered as a microreactor and the only function assigned to the reactor in a conventional sense is that of adequately providing for mass and heat transfer. A limited number of reaction stages in series, each maintained at a different composition in order to produce different sequences of macromolecular chains does not allow adequate homogeneity at the level of each granule to be obtained, in that the granule itself consists of well distinct portions of polymer of different composition.

A possible approach to the problem has been proposed in U.S. Pat. No. 4,098,974. This patent describes an olefin polymerization process in suspension, aimed at the production of HDPE, in the presence of inert hydrocarbon solvents, carried out in two reactors operating at different hydrogen concentrations, wherein a portion of the slurry exiting one of the reactors is recycled to the other reactor, downstream of a flash tube for hydrogen degassing. This results in the polymers obtained having a more homogeneous distribution of the fractions of different molecular weight than polymers obtained from reactors in series.

The degree of recycle used is high. In fact, from the recycle line an amount of suspension is discharged which is comprised between 1/3 and 1/15, preferably 1/7 and 1/12, of the recycled amount. This corresponds to a ratio of the recycle flow rate to the discharge flow rate (recycle ratio) comprised between 3 and 15, preferably between 7 and 12.

Such high recycle ratios constitute a considerable load for the process, in that at each recycle the slurry must be recompressed from the flash pressure to the reaction pressure. Analogous repercussions occur on the recompression of the gases resulting from the flash operation.

Furthermore, the MWD of the polymers obtained is not very broad, which is at least partially due to the fact that, regardless of the mode of operation, a certain amount of hydrogen always remains dissolved in the solvent, thus making it more difficult to obtain very different molecular weights in the two reactors.

It is known that modifications of the high molecular weight polymer with higher comonomers impart improved mechanical properties to manufactured articles. In order to obtain such products, the presence of heavy comonomers is required in the reactor operating in the absence or with very little amounts of hydrogen. Since such comonomers remain dissolved in the solvent, they would inevitably also reach the reactor with a high hydrogen content. Therefore, products which are modified as described above cannot be produced by the process described in U.S. Pat. No. 4,098,974.

A process which contemplates two fluidized bed gas-phase reactors between which a considerable polymer recycling is maintained by means of screw conveyors is described in Italian Patent 690208. Such process is directed to obtaining polymer chains containing blocks of propylene units alternated with blocks of ethylene units or blocks of propylene units alternated with blocks of random ethylene-propylene copolymers by the continuous transfer of the polymer between the different reactors in which different olefins are polymerized. It is known that block copolymers are not formed in such process, but rather a mechanical mixture of polypropylene and polyethylene or ethylene/propylene copolymers is formed.

The recycle ratio used in said process is very high, about 57/1, and would require, if applied to modern gas-phase processes which use catalysts endowed with high hourly productivity, the use of very high hourly flow rates as well as the recovery and recycle of enormous quantities of gas, which cannot be implemented in the industrial practice.

The transfer system by means of screw-conveyors involves serious mechanical problems associated with the transfer of a powder which is still reacting and would require, if applied to modern gas-phase processes using catalysts endowed with high hourly productivity, the use of very high hourly flow rates as well as the recovery and recycle of enormous amounts of gas, which cannot be implemented in industrial practice. The primary need of avoiding the transfer of different monomers from one reactor to the other would require complicated stopping means and washes with significant amounts of inert gas, the recovery and recycle thereof would involve technical difficulties and prohibitive costs.

Furthermore, gas-phase polymerization processes require that the catalysts be capable of producing polymer in the form of particles exhibiting a controlled morphology and a high bulk density, and that polymerization conditions be such as to allow an effective control of heat transfer during the course of the reaction in order to avoid fouling of the reactor walls and/or the formation of agglomerates or other drawbacks which may bring to a halt the run of the plant.

These demands are even more significant felt when the gas-phase process contemplates the recycling of the polymer between the reactors.

It has now been found that it is possible to prepare polymers or copolymers of olefins $CH_2=CHR$ endowed with a highly homogeneous composition by gas-phase (co) polymerization processes carried out in two or more fluidized or mechanically agitated bed reactors operating under different reaction conditions, by carrying out the recycle of the polymer between the reactors at relatively low recycle ratios; the polymer forming the fluid bed or being circulated has a bulk density of greater than 0.35 g/cm³.

BRIEF DESCRIPTION OF THE DRAWINGS

The invention is shown with reference to the enclosed drawings, which are given to merely illustrate and not to limit the invention, in which.

In the process of the invention olefins $CH_2=CHR$, wherein R is hydrogen or an alkyl radical having 1–12 carbon atoms, are polymerized in the gas phase in the presence of a catalyst comprising the product of the reaction of a solid catalyst component containing a titanium compound having at least one Ti-halogen bond supported on a magnesium dihalide in active form with an Al-alkyl compound, by operating in at least two interconnected fluidized or mechanically agitated bed reactors where different reaction conditions are present. The process is characterized in that the polymer formed in the reactor where the catalyst is introduced (first reactor) is transferred into a second reactor where the polymer which is formed therein is recycled to the first reactor by using ratios between recycle flow rate and discharge flow rate comprised between 2 and 6 and in that the catalyst is capable of yielding a polymer having a poured bulk density (measured according to DIN-53194) of at least 0.35 g/cm³.

Examples of titanium catalysts usable in the process of the invention include the reaction product of:

1) a solid component comprising a titanium compound containing at least one Ti-halogen bond supported on magnesium halides in active form. The magnesium halide in active form, which is preferably $MgCl_2$, is characterized by an X-ray spectrum wherein the most intense diffraction line appearing in the spectrum of the non active halide is diminished in intensity and is substituted by a halo the intensity maximum of which is shifted towards diffraction angles lower than the most intense line, or this line appears more broadened. The solid component can also comprise an electron-donor compound (inside donor).

2) an alkyl aluminum compound, optionally in the presence of an electron-donor compound (outside donor).

The titanium compounds suitable for preparing the solid component 1) include the halides, such as $TiCl_3$ or preferably $TiCl_4$, and the alkoxides, such as for example trichlorobutoxy or trichlorophenoxy-titanium. Optionally, the solid component 1) can be also supported on organic or inorganic inert supports, such as for example $SiO_2$, $Al_2O_3$ or mixtures thereof.

Generally the inside electron-donor compound and the outside electron-donor compound are used when one desires to prepare stereoregular polymers, such as polypropylenes endowed with a high Isotactic Index.

Controlled morphology catalysts are especially suitable for the process of the invention. Examples of spherically shaped solid components suitable for preparing said catalysts are described in U.S. Pat. No. 4,399,054 and in U.S. Pat. No. 5,139,985, the description thereof being herein incorporated by reference. Components and catalysts obtained from supports having a regular geometric shape other than the spherical shape can also be used, such as those described in patent application EP-A-449,673.

Other examples of usable solid components are described in U.S. Pat. Nos. 4,748,221 and 4,302,566. Included among the components usable in the process of the invention are also those described in U.S. Pat. Nos. 4,472,520 and 4,218,339.

Preferably the solid component is in the form of spherical or spheroidal particles having a size comprised between 10 and 120 μm and is capable of yielding polymers having a particle size distribution such that less than 10% by weight of the particles has a diameter smaller than 200 μm and more than 80% by weight of the same particles has a diameter greater than 500 μm.

Examples of usable catalysts capable of yielding polymers endowed with the above indicated bulk density and particle size distribution characteristics are described in U.S. Pat. Nos. 5,578,541 and 5,585,317, the description thereof being herein incorporated by reference. The catalysts described therein are prepared by precontacting the solid catalyst components and the Al-alkyl compound in the substantial absence of monomer and are thereafter used in a prepolymerization step. The resultant prepolymer is fed to the gas-phase polymerization reactor. Generally, the prepolymer has a bulk density of at least 0.30 g/cc and a size comprised between 10 and 3,000 μm.

The precontact of the catalyst components takes place at temperatures lower than about 60° C., preferably comprised within the range of from about 0° to 60° C., and in the substantial absence of olefin, wherein substantial absence means that small amounts of olefin can be present. The thus prepared catalyst is used to prepolymerize one or more $CH_2$=CHR olefins, wherein R is hydrogen or an alkyl having from 1 to 12 carbon atoms, in an amount ranging from 0.5 g/g of the catalyst to up to 10% by weight on the final catalyst yield. When the prepolymerization is carried out using one or more olefins other than ethylene, the process is conducted using a catalyst comprising an inside donor and optionally also an outside donor, in order to form a polymer having an insolubility in xylene of greater than 60% by weight.

The solubility in xylene is determined by dissolving 2 g of the polymer in 250 cm$^3$ of xylene at 135° C. and stirring the system. After 20 min the solution is allowed to cool to 25° C. After 30 min the precipitated material is filtered; the solution is evaporated under a nitrogen flow and the residue is dried at 80° C. In this way the percentage of polymer soluble in xylene at ambient temperature is calculated and, consequently, the percentage of the insoluble portion.

According to a preferred scheme the process of the invention contemplates the use of two or more fluidized or mechanically agitated bed gas-phase reactors or reactor stages, a $C_2$–$C_5$ alkane being kept in the gas phase at a molar concentration of greater than 20% and up to 90% with respect to the total gases. Preferably the alkane is propane.

Figure 1:
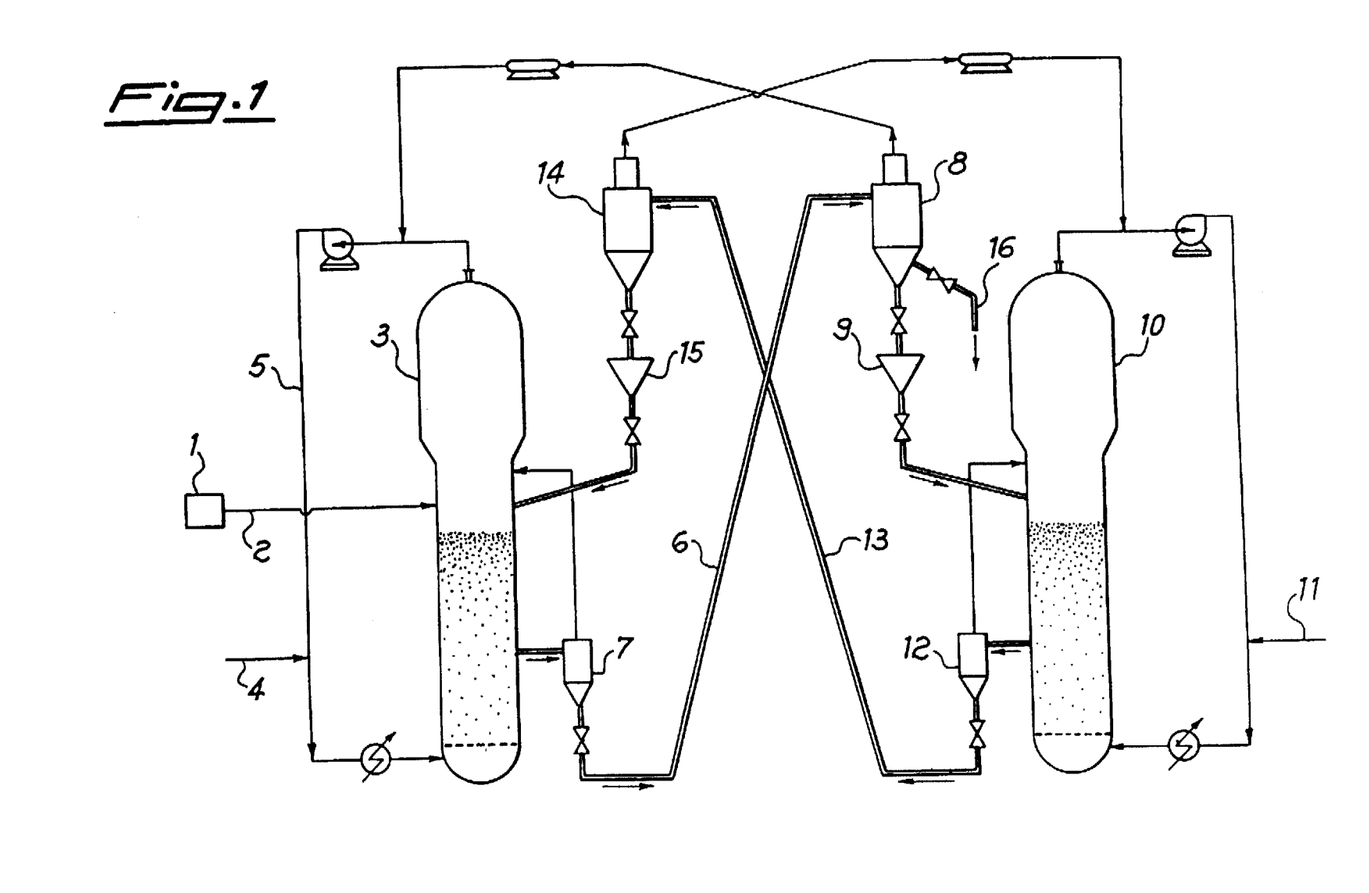
FIG. 1 is a flow sheet showing a first embodiment of the process according to the invention.

An embodiment of the process related to the invention is illustrated in the simplified flow sheet of FIG. 1. Reference numeral 1 indicates the assembly of apparatuses wherein the preparation of the catalyst system and the separation of the obtained solid catalyst or prepolymer takes place. The catalyst (or the prepolymer) is fed by means of the transfer line 2 to the gas-phase reactor 3. As indicated by the arrow 4 the fresh gas feeds (monomer/s and optionally hydrogen and inert gas) are fed to reactor 3 into the gas recycle line 5. By means of the transfer line 6, the polymer discharged from the reactor 3 and packed in the chamber 7 is transferred to the solid-gas separator 8 and is introduced by means of the lock hopper 9 into the gas-phase reactor 10. To the reactor 10 fresh monomers (possibly different from those fed in 4) and optionally hydrogen and inert gas are fed, as indicated by the arrow 11. From the reactor 10 the recycle polymer is discharged by means of the packing chamber 12. By means of the line 13 the polymer reaches the solid-gas separator 14 and by means of the lock-hopper 15 is introduced into the reactor 3. The product of the process is conveniently discharged from the separator 8 (or alternatively from the separator 14) through the discharge line 16. Reactor volumes and operating pressures can be equal or different.

The technique used contemplates continuously discharging the polymer into a receiver (separators 8 and 14) kept at a sufficiently low pressure so as to cause the release of the major portion of the monomers dissolved in the polymer itself. Preferably this pressure is kept slightly above the atmospheric pressure (in any case markedly below the reactor pressure). Such condition prevents the separator from becoming a polymerization site, polymerization rate being proportional to the partial monomer pressure. Owing to the interposition of the packing chambers 7 and 12, a limited amount of gas is released. Said gas is recompressed and sent to the reactor from which it was received, after the removal of entrained solid particles if necessary. Feeding of the solid to the next reactor is accomplished by the "lock-hopper" technique, by opening and closing of the valves isolating the lock-hopper (9 and 15) itself in a proper sequence. The amount of gas fed with the polymer to the reactor by this route only consists of the gas which is intergranular under the pressure conditions existing in each of the receivers/separators 8 and 14. By suitably selecting these conditions (preferably close to the atmospheric pressure) the amount of gas fed becomes negligible. Therefore, a recycle of solids is accomplished independent of the gas composition in the two reactors.

Figure 2:
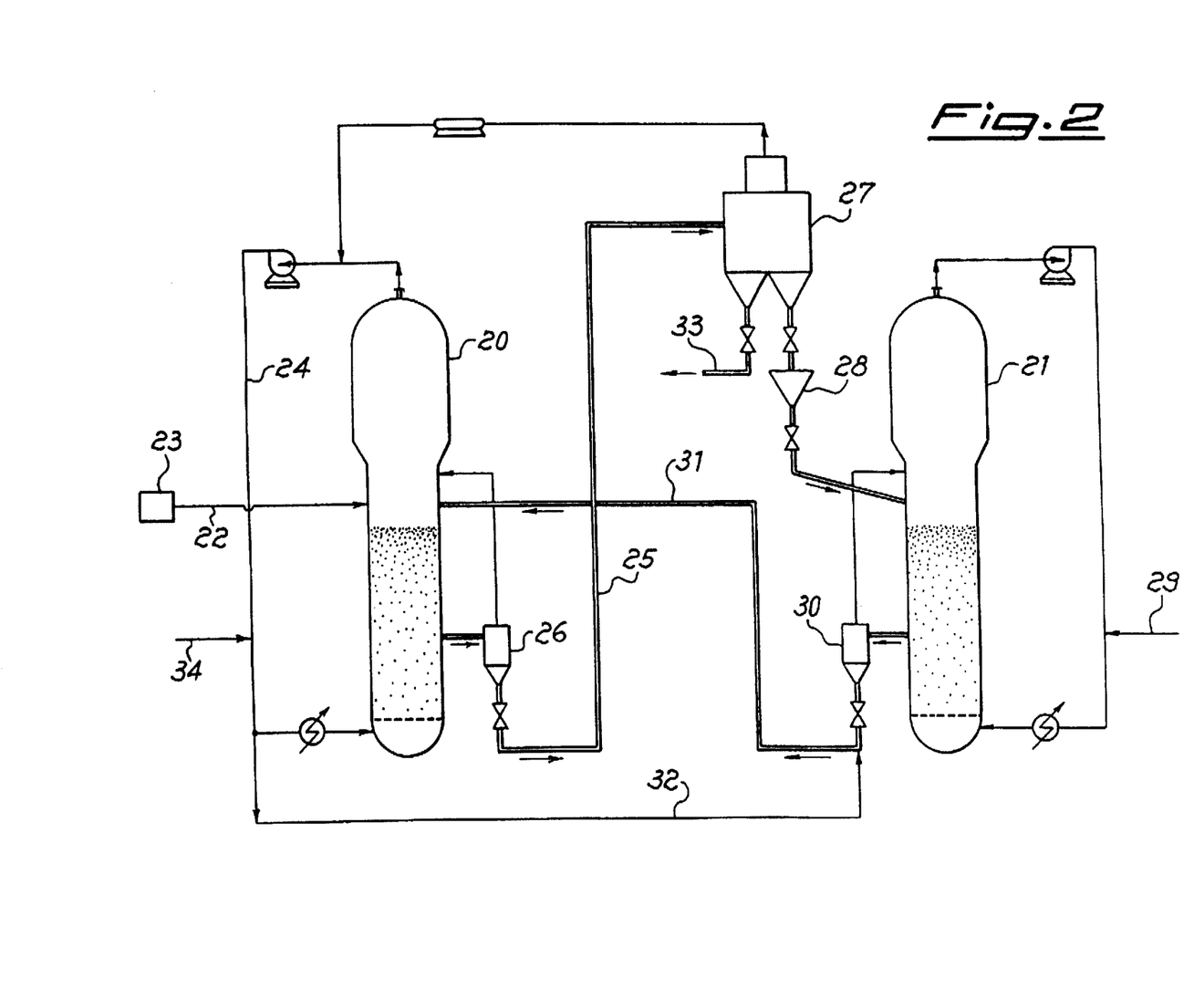
FIG. 2 is a flow sheet showing a second embodiment of the process according to the invention.

FIG. 2 schematically shows another possible embodiment in the gas phase of a process according to the invention, with two reaction stages at different hydrogen concentration and with the recycle of polymer from one stage to the other, which can especially be applied to the production of broad-MWD HDPE. The reactor 20 represents the reactor having a hydrogen-rich composition; the gas phase in the reactor 21 contains a limited amount of hydrogen or none. The prepolymer or the catalyst, prepared in the assembly of apparatuses 23, is fed by means of the line 22 to the gas-phase reactor 20. As indicated by the arrow 34, the fresh gas feeds (monomer/s, hydrogen and optionally inert gas) are fed to the reactor 20 into the gas recycle line 24. By means of the transfer line 25, the polymer discharged from the reactor 20 and packed in chamber 26 is transferred to the solid-gas separator 27 and is introduced by the lock-hopper 28 into the gas-phase reactor 21. Fresh monomers and optionally hydrogen and inert gas are fed to the reactor 21, as indicated by the arrow 29. From the reactor 21 the recycle polymer is discharged by means of the packing chamber 30 into the recycle line 31, which directly feeds it to the reactor 20. Into the line a suitable amount of compressed gas is introduced (line 32) taken from the gas fluidization circuit of the reactor 20 in order to assure a pneumatic transfer regime into the line 31.

Owing to the fact that the packed polymer discharged from the packer 30 contains limited amounts of gas, that this gas consists essentially of the same monomer which is caused to react in the reactor 20 and that the amount of monomer which is caused to react in the reactor 20 is very large, the process is easily managed and assures the production of a broad-MWD HDPE homogeneous products being obtained.

The ratio of the recycled polymer to the discharged polymer is generally comprised between 2 and 4, preferably between 3 and 5.

According to a preferred embodiment, it is possible to prepare broad molecular weight distribution polymers or copolymers of olefins $CH_2$=CHR endowed with a highly homogeneous composition by gas-phase (co)polymerization processes carried out in two or more reactors by an entirely continuous process which contemplates recycling the polymer between the reactors, and packing and washing the polymer with a suitable gas at the outlet of at least one reactor.

In such a process, olefins $CH_2=CHR$ are polymerized in the presence of a catalyst capable of producing polymers having a poured bulk density (measured according to DIN-43194) of greater than 0.35 $g/cm^3$ and comprising the product of the reaction of a solid catalyst component containing a titanium compound having at least one Ti-halogen bond supported on a magnesium dihalide in active form with an Al-alkyl compound, by operating in at least two interconnected fluidized or mechanically agitated bed reactors wherein different concentrations of a molecular weight regulator are present. The polymer formed in the reactor where the catalyst is introduced (first reactor) is continuously transferred into a second reactor, where the polymer which is formed therein is continuously recycled to the first reactor. The process is characterized in that the polymer exiting the reactor in which the gas phase operates at higher ratios of molecular weight regulator/monomer is continuously packed and washed with a suitable gas to remove the molecular weight regulator, and is thereafter sent to the reactor operating in the absence of the molecular weight regulator or with lower molecular weight regulator/monomer ratios.

Packing is carried out so as to increase the bulk density of the polymer being transferred from the density values of the polymer bed present in the reactor to values approaching the poured bulk density of the polymer produced.

In this manner it is possible to carry into effect the washing of the exiting polymer with minimum quantities of gas which displace the interstitial gas anyhow performing an effective stopping action against the gas dragged by the polymer and consequently against the molecular weight regulator.

Furthermore, by suitably dimensioning the packing system it is possible to achieve high mass flow rates of the polymer; very limited residence times result thus avoiding uncontrolled reactions which would invalidate the practical implementation of the process.

Conveniently, the wash gas is fed countercurrent to the flow of the polymer being packed.

Preferably, this process contemplates maintaining in the gas phase a $C_3$-$C_5$ alkane in a molar concentration of greater than 20% and up to 90% of the gases present. Conveniently the wash gas comprises, at least partially, the same $C_3$-$C_5$ alkane present in the gas phase of the reactors and is withdrawn from the gas recycle circuit of the reactor or reactors operating in the absence of the molecular weight regulator or with lower molecular weight regulator/monomer ratios. Preferably, the alkane is propane.

Partial condensation of a portion of the gas in the gas recycle circuit of the reactor with a high content of the molecular weight regulator is a way of obtaining substantial amounts of condensate which are to be considered practically free of the molecular weight regulator. The condensate, consisting of an alkane/monomer mixture rich in alkane and containing only limited amounts or none of the molecular weight regulator, is fed to the subsequent reactor and can generate the gas carrier for washing the packed polymer and balancing the reactor pressures. Balancing allows the various reactors to substantially operate under the same absolute pressure.

A preferred molecular weight regulator is hydrogen.

Figure 3:
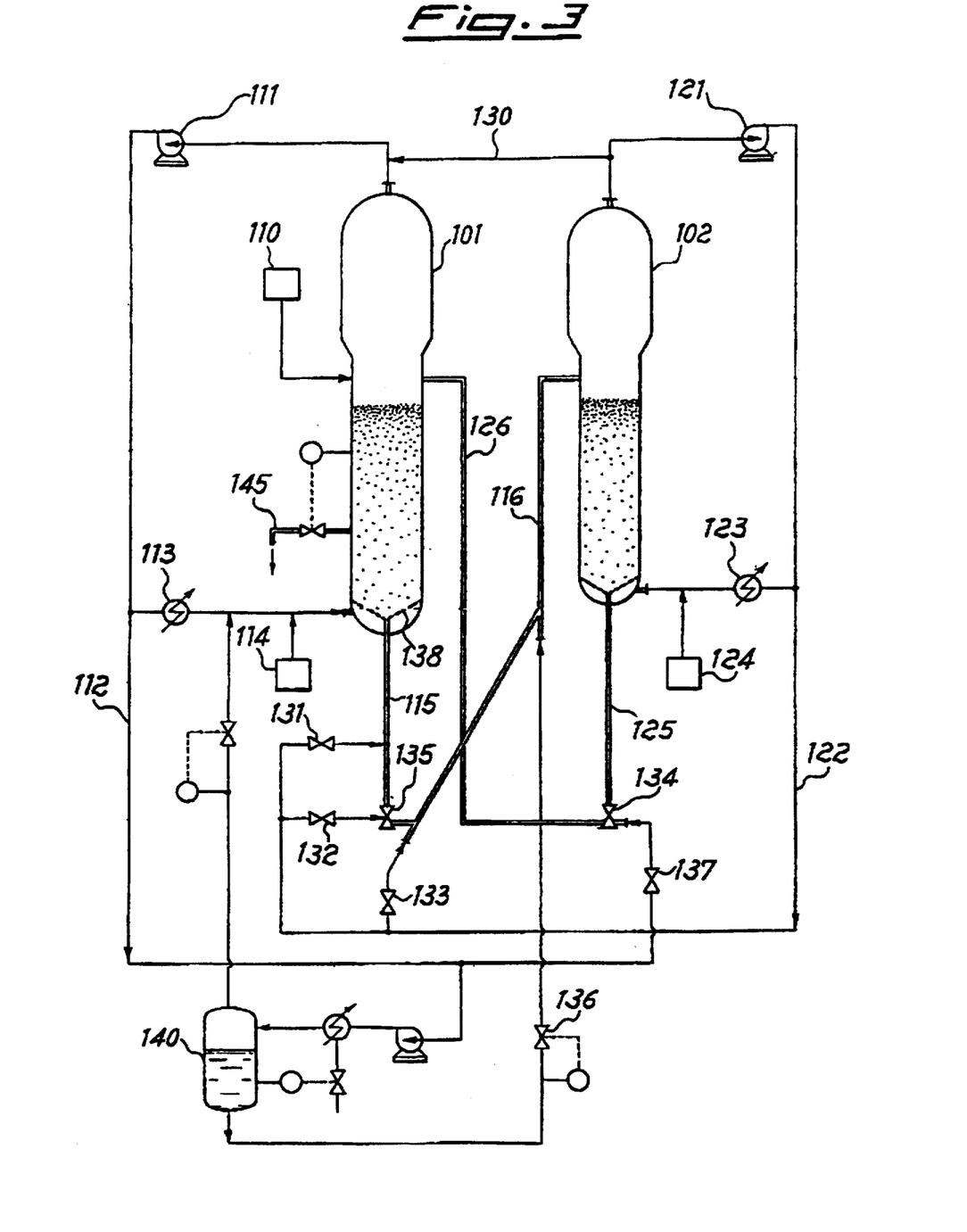
FIG. 3 shows an apparatus to carry out a preferred embodiment of the process according to the invention.

A scheme of the preferred embodiment of this process is illustrated in FIG. 3. The process takes place in two fluidized bed gas-phase reactors (101, 102), with a fluidization circuit (112, 122) comprising compressors (111, 121) and coolers (113, 123). With reference to the preparation of broad MWD HDPE, the gas circuit of (101) is characterized by a high molecular weight regulator/ethylene ratio, whereas in the gas-phase of (102) said ratio is kept conveniently low. The catalyst or the prepolymer prepared in section (110) is preferably fed to reactor (101). To the same reactor (101) the monomer/s and the molecular weight regulator are fed through the feed line (114); the monomer/s are fed to the reactor (102) through feed line (124). Recycling of the polymer among the reactors takes place through the substantially vertical pipe ("stand-pipe") (115), the top end thereof being located inside the fluidized bed and the bottom end being connected to the transfer pipe (116). Preferably, but not necessarily, the inlet point is located in the centre of the gas distribution grid (138), which can be built with a suitable inclination toward said point in order to facilitate polymer inflow. Within said pipe (115) the polymer flows in a packed form. The circulation flow rate is regulated by means of a valve (135), such as a mechanical throttle valve or, preferably, an L-valve consisting of a short horizontal section of pipe joined to the descending section of the packing pipe (115) by means of a curved connection having a small radius of curvature. A specified quantity of gas is sent to said valve (135) by means of the valve (132); by means of a valve (131), a gas stream is sent to the "standpipe" to wash the polymer being packed and displace the interstitial gas. At the outlet of the valve (135), the polymer is pneumatically transported through line (116) to the reactor (102) by a gas stream introduced through the valve (133). Conveniently, the valves (131, 132, 133) are connected to the gas recycle line (122) of reactor (102), wherefrom they receive the gas to thereafter introduce it into the pipes (115) and (116). A portion of the fluidization gas (112) of reactor (101) can be condensed in (140); the condensate produced is introduced into the transfer pipe (116), the flow rate being regulated by means of the valve (136); the vapours separated in (140) are reintroduced into the line (112), preferably at a point downstream of the cooler (113). Reactor (102) is capable of producing the required high molecular weight polymer fraction, by suitably regulating both the composition of reaction gases and the residence time. The polymer from the reactor (102) flows through the pipe (125) in a packed form; flow rate regulation is accomplished by means of the valve (134) which can be, for example, a mechanical throttle valve or, preferably, an L-valve. Carrying out the washing of the polymer being packed in order to displace the interstitial gas is not necessary, since said gas is perfectly compatible with the reaction environment of reactor (101). Through line (126) the polymer is pneumatically transported to reactor (101) by a gas stream introduced through the valve (137). Conveniently, the valve (137) is connected to the gas recycle line (112) of reactor (101), wherefrom it receives the gas to thereafter introduce it into pipe (126). The balancing line (130), pipes the residual excess gas mixture from reactor (102) into the fluidization line of reactor (101), at a point upstream of the compressor (111). The polymer produced can be discharged from any point of the two reactor system, such as from line (145), provided the flow rate thereof assures a constant level of the polymer in the reactors.

As known, the high molecular weight polymer fraction is relatively limited. It is also known that the molecular weight regulator/monomer ratio very greatly affects the kinetics of polymerization. Therefore, the reactor operating at lower molecular weight regulator/monomer ratios requires shorter residence times, and consequently smaller dimensions, than the reactor operating at higher values of said ratio.

Figure 4:
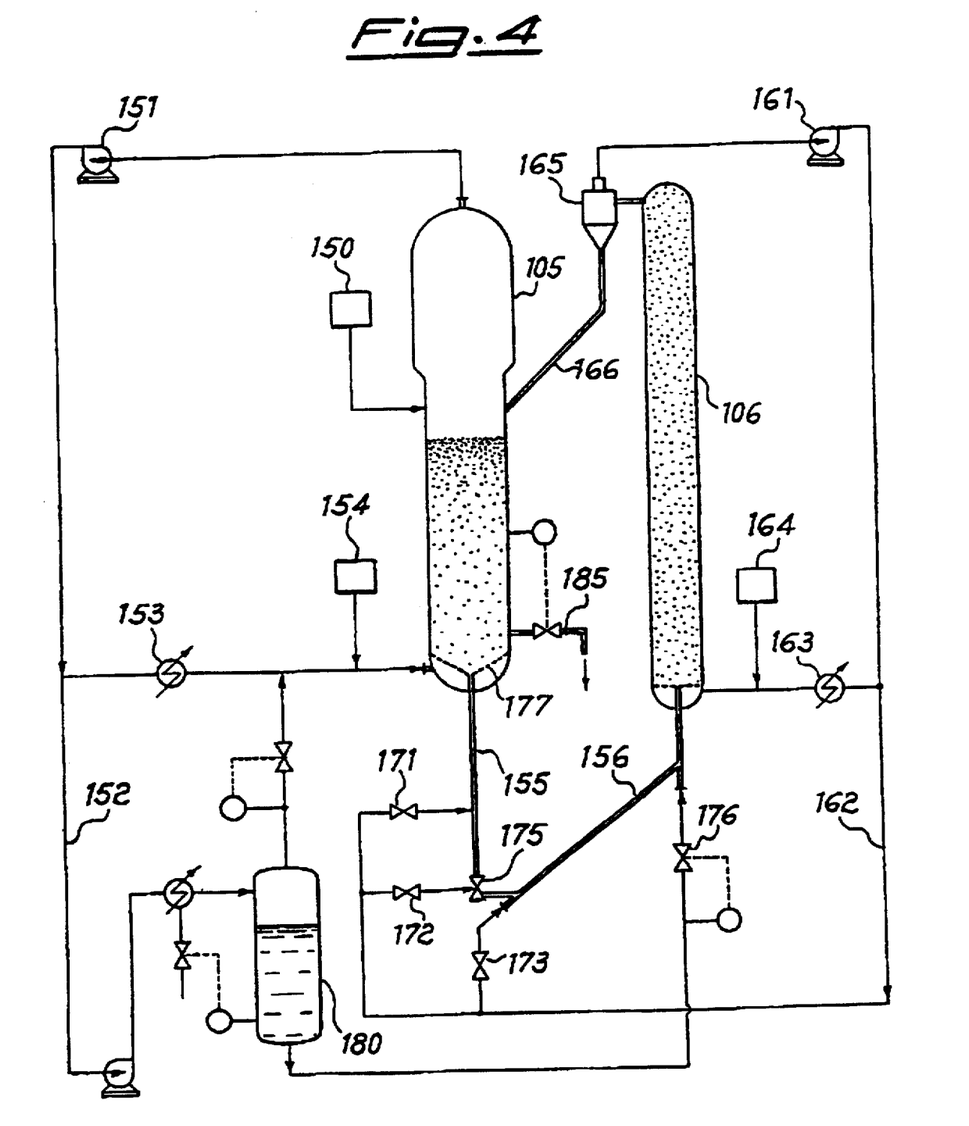
FIG. 4 shows another apparatus to carry out a preferred embodiment of the process according to the invention.

Utilizing the above considerations, an alternative process scheme for practicing the preferred embodiment of the invention is illustrated in FIG. 4.

The process takes place in two gas-phase reactors (105, 106), one (105) being a fluidized bed reactor and the other (106) being a tubular reactor having a suitable size and in any case a high length to diameter ratio, wherein turbulent fluidized bed ("Fast Fluidized Bed") conditions are maintained. The reactors are connected through transfer pipes (156, 166); the fluidized bed reactor (105) is provided with catalyst or prepolymer feeding systems (150), and both reactors are provided with feeding systems for the monomer/s (154, 164) and with fluidization lines (152, 162) comprising gas compression (151, 161) and cooling (153, 163) systems. The fluidized bed reactor (105) is provided with a discharge device comprising a packing pipe ("standpipe") (155), the top end thereof being located inside the fluidized bed and the bottom end being connected to the transfer pipe (156). Preferably, but not necessarily, the inlet point is positioned in the centre of the gas distribution grid (177), which can be built with a suitable inclination toward said point to facilitate polymer inflow. Within said pipe (155) the polymer flows in a packed form. The circulation flow rate is regulated by means of a valve (175) which can be, for example, a throttle mechanical valve or, preferably, an L-valve consisting of a short horizontal section of pipe joined to the descending section of the packing pipe (155) by means of a curved connection having a small radius of curvature. A specified quantity of gas is sent to said valve (175) by means of the valve (172); by means of the valve (171), a gas stream is sent to the "standpipe" to wash the polymer being packed and displace the interstitial gas. At the outlet of the valve (175), the polymer is pneumatically transported through the line (156) into the bottom of the tubular reactor (106) by a gas stream introduced through the valve (173). Conveniently, the valves (171, 172, 173) are connected to the gas fluidization line (162) of reactor (106) wherefrom they receive the gas to thereafter introduce it into the pipes (155) and (156). The polymer/gas mixture exiting the top of the tubular reactor (106) enters a solid/gas separator (165), preferably of the cyclone type, which discharges into the transfer line (166) the solid and the excess gas fed. From the head of the separator the line (162) takes, by means of the compressor (161), an amount of gas sufficient to sustain the fluidization flow rate and optionally the feeding flow rate to the above mentioned valves (171, 172, 173). A portion of the fluidization gas (152) of the reactor (105) can be conveniently condensed in (180); the condensate produced is introduced into the transfer pipe (156), the flow rate being regulated by means of the valve (176); the vapours separated in (180) are reintroduced into the line (152), preferably at a point downstream of the cooler (153). The amount of polymer produced in the tubular reactor (106) can be controlled, for example, by varying the partial monomer pressure by changing the flow rate of the condensate feed by means of the valve (176). The polymer produced can be discharged from any convenient point of the two reactor system, such as from the line (185), provided the flow rate thereof assures a constant level of the polymer in the reactor (105).

Another aspect of the invention consists of an apparatus for the polymerization of olefins $CH_2=CHR$, illustrated in FIG. 3, comprising a couple of fluidized bed gas-phase reactors (101, 102) provided with feeding systems for the catalyst.(110) and the monomers (114, 124) and with fluidization lines (112, 122) comprising gas cooling (113, 123) and compression (111, 121) systems, said fluidized bed gas-phase reactors being connected by transfer pipes (116, 126). Said apparatus is characterized in that at least one of the two reactors (101) is provided with a discharge device comprising a packing pipe (115) the top end thereof being located inside the fluidized bed and the bottom end being connected to one of the transfer pipes (116); said packing pipe (115) being provided with a first valve (135) for regulating the circulation flow rate, to which a gas stream is sent by means of a second valve (132), and with a third valve (131) for introducing the wash gas; said transfer pipe (116) being provided with a fourth valve (133) for introducing a gas stream, located between said first valve (135) and the outlet of the pipe (116) into the reactor (102).

Preferably, the top end of the packing pipe (115) is located in the centre of a gas distribution grid (138) and said first valve (135) is an-L valve, consisting of a short horizontal section of pipe joined to the descending section of the packing pipe (115) by means of a curved connection having a small radius of curvature.

The gas recycle line (122) of reactor (102) is preferably connected to said second, third and fourth valves (131, 132, 133).

Preferably, the apparatus also comprises a gas condensation system (140) fed by the gas fluidization line (112) of the reactor (101), said condensation system (140) being connected to the transfer pipe (116) by means of a fifth metering valve (136), at a point between said fourth valve (133) and the outlet of said transfer pipe (116) into the reactor (102), and being connected to the gas feeding line of the reactor (101) at a point downstream of a cooler (113).

According to a preferred aspect, also the reactor (102) is provided with a discharge device comprising a packing pipe (125), the top end thereof being located inside the fluidization bed and the bottom end being connected to one (126) of said transfer pipes; said packing pipe (125) being provided with a valve (134) for regulating the circulation flow rate; said transfer pipe (126) being provided with a valve (137) for introducing a gas stream, located between said flow rate regulating valve (134) and the outlet of said transfer pipe (126) into the reactor (101).

The gas recycle line (112) of reactor (101) is conveniently connected to the valve (137).

An alternative apparatus for practicing the process according to the invention (FIG. 4) comprises a couple of gas-phase reactors (105, 106), connected by transfer pipes (156, 166) and provided with feeding systems for the catalyst (150) and the monomers (154, 164) and with fluidization lines (152, 162) and gas compression (151, 161) and cooling (153, 163) systems, and is characterized in that one (105) of the two reactors is a fluidized bed reactor, whilst the other (106) is a tubular reactor wherein turbulent fluidized bed conditions are maintained; said fluidized bed reactor (105) being provided with a discharge device comprising a packing pipe (155) the top end thereof being located inside the fluidized bed and the bottom end being connected to the transfer pipe (156); said packing pipe (155) being provided with a first valve (175) for regulating the circulation flow rate to which a gas stream is sent by means of a second valve (172), and with a third valve (171) for introducing the wash gas; said pipe (156) being provided with a fourth valve (173) for introducing a gas stream, located between said first valve (175) and the outlet of the transfer pipe (156) into the bottom of said tubular reactor (106); the top of said tubular reactor (106) being connected to a solid/gas separator (165); said solid/gas separator being connected to said gas recycle line (162) of said tubular reactor (106) and to a transfer pipe (166) which leads to said fluidized bed reactor (105).

Preferably, the top end of said packing pipe (155) is located in the centre of a gas distribution grid; said first valve (175) is an-L valve, consisting of a short horizontal section of pipe joined to the descending section of said packing pipe (155) by means of a curved connection having a small radius of curvature; said solid/gas separator (165) is of the cyclone type.

The gas recycle line (162) of said tubular reactor (106) is preferably connected to said second, third, and fourth valves (171, 172, 173).

Preferably, the apparatus comprises a gas condensation system (180) fed by said gas recycle line (152) of the fluidized bed reactor (105), said condensation system (180) being connected to the transfer pipe (156) by means of a fifth metering valve (176), at a point between said fourth valve (173) and the outlet of said transfer pipe (156) into reactor (106), and being connected to the gas feed line of the reactor (105) at a point downstream of a heat exchanger (153).

The process of the invention can be applied to the production of broad molecular weight distribution polymers and copolymers either of ethylene or propylene.

A preferred molecular weight regulator is hydrogen. Other regulators such as zinc dialkyls can also be used. The amount of polymer which is formed in the two reactors determines the average molecular weight and the width of the molecular weight distribution. The amounts of polymer are controlled through the residence times or the monomer concentration in the various stages.

In the case of the polymerization of ethylene, the polymer obtained is in the form of spherical particles wherein less than 10% by weight of the particles has a size smaller than 200 μm and a fraction of greater than 80% has a size larger than 500 μm.

In the case of the production of linear polyethylene, the ratio of the MIF to the MIE index is between 50 and 200 for a MIE=0.15 g/10 min. The real density of the polymer is between 0.930 and 0.970 g/cm$^3$. A 50 μm flat film contains a number of unmelted particles (commonly referred to as fisheyes) which is lower than 500/m$^2$. The limited number of unmelted particles present in the 50 μm flat film is a criterion for evaluating polymer homogeneity. A number of unmelted particles lower than 500/m$^2$ is a particularly interesting result in the case of a polyethylene having a melt index ratio F/E of greater than 100.

Ethylene polymers exhibiting such degree of homogeneity and such broad molecular weight distribution constitute a further aspect of the invention.

Besides the preparation of broad MWD polymers and copolymers the process of the invention can be applied to the production of polymer compositions wherein polymer or copolymers of different compositions are prepared in two or more stages. In particular, the process can be applied to the preparation of polypropylene compositions wherein in one or more stages polypropylene homopolymer or propylene copolymers having a minor content of ethylene and/or alpha-olefin such as butene-1 is prepared, and in one or more subsequent stages ethylene-propylene elastomeric copolymers are prepared. Examples of these preparations are described in European Patents EP-77532, EP 373660, EP-400333.

The following examples are given to merely illustrate and not to limit the invention. Variations are possible without altering the spirit and scope of the invention itself.

EXAMPLES

The solid component used in the examples was prepared according to the following procedure.

Preparation of the Solid Catalyst Component

Under an inert atmosphere, 28.4 g of MgCl$_2$, 49.5 g of anhydrous ethanol, 10 ml of ROL OB/30 vaseline oil, and 100 ml of a silicon oil having a viscosity of 350 cs were introduced into a reactor equipped with a stirrer. The reaction mixture was heated at a temperature of 120° C. under stirring and an adduct was obtained of MgCl$_2$ with ethyl alcohol, which melted and reined mixed with the dispersant. The mixture was thereafter transferred hot into a 1,500 ml vessel equipped with an Ultra Turrax T-45 stirrer and containing 150 ml of vaseline oil and 150 ml of silicone oil. The temperature was kept at 120° C. while stirring for 3 minutes at 3,000 rpm. The mixture was then discharged into a 2 liter vessel equipped with a stirrer and containing 1,000 ml of anhydrous of n-heptane cooled at 0° C. and kept under agitation, conducted at a speed of 6 meters per second, for about 20 minutes while keeping the temperature at 0° C. The thus obtained particles were recovered by filtration, washed with 500 ml aliquots of n-hexane and heated gradually, by raising the temperature from 500° C. to 100° C. for a period of time sufficient to reduce the alcohol content from 3 mols to the desired number of moles.

The adduct (25 g), containing the desired amount of alcohol, was transferred to a reactor equipped with a stirrer and containing 625 ml of TiCl$_4$, at 0° C. under agitation. It was then heated at 100° C. for one hour. When the temperature reached 40° C., diisobutylphthalate was added in such an amount that the molar ratio of Mg to the phthalate was 8.

The reactor contents were then heated at 100° C. for two hours under agitation and thereafter the solid was allowed to settle. The hot liquid was removed by means of a siphon. 500 ml of TiCl$_4$ were added and the mixture was heated at 120° C. for one hour under agitation. The agitation was interrupted and the solid was allowed to settle. The hot liquid was removed by means of a siphon. The solid was washed with aliquots of n-hexane at 60° C. and thereafter at ambient temperature.

EXAMPLE 1

High density polyethylene (HDPE) was prepared in a pilot plant operating continuously. The plant comprises a catalyst activation reactor, a loop reactor wherein the prepolymerization was carried out, two fluidized bed gas-phase reactors connected in series and a recycle line between the two polymerization reactors. The gas-phase reactors were of the type described in U.S. Pat. No. 4,518,750.

The solid catalyst component was prepared according to the above indicated procedure, using an MgCl$_2$-ethanol adduct containing 35% by weight of alcohol. The solid component, an aluminum triethyl (TEAL) solution in n-hexane, dicyclohexyldimethoxysilane (DCPMS) as the electron donor (ED) and propane as the inert medium were fed to the activation reactor kept at a constant temperature of 15° C. The amounts fed were such that the TEAL/ED weight ratio was 18 and the TEAL/Ti molar ratio was 330. To the activation reactor propane was also fed as the inert medium.

After an average residence time of about 6 minutes, the product was discharged and fed to a loop prepolymerizer, maintained at a temperature of 25° C., to which also a certain amount of liquid propylene and propane (as the inert medium) were fed. The average residence time in the prepolymerizer was about 70 minutes.

The fluid contained in the prepolymerizer was in the liquid state. The liquid propylene was practically completely transformed into solid polypropylene. The residual amount of propylene discharged with the polymer from the prepolymerizer was flash separated, in order to have a negligible amount of propylene fed to the gas-phase reactor.

The fluidized bed reactor which receives the prepolymer produced in the preceding stage operates at a temperature of 60° C. and under a reaction pressure maintained at 2 MPa.

The fresh gas feed to the gas-phase reactors consisted of ethylene, hydrogen as the molecular weight regulator and propane. The amounts fed were such as to give the gas phase concentrations indicated in Table 1, which reports the main operating conditions of the plant and the characteristics of the polymer produced. Melt Index "E" and Melt Flow ratio "F/E" are determined on the product obtained after extrusion and pelletization. Poured bulk density and tamped bulk density are determined according to DIN-53194.

From the polymer obtained from the process, thin films free of unmelted particles have been prepared. This result is particularly interesting and significant if it is considered that the catalyst used in the example produces narrow MWD polymers, which exacerbates polymer homogeneity problems.

Comparative Example 1

An HDPE was prepared by using a pilot plant operating continuously and comprising two fluidized bed gas-phase reactors connected in series. Differently from Example 1, all of the polymer exiting the second reactor was discharged from the process; that is the operation was conducted without recycling.

The prepolymer-catalyst system was prepared according to the same procedure specified in Example 1 and was introduced into the first fluid bed reactor together with fresh ethylene, propane and hydrogen gas feeds.

Main operating conditions of the plant and characteristics of the polymer produced are reported in Table 2; Melt Index "E" and Melt Flow ratio "F/E" are determined on the product obtained after extrusion and pelletization. Poured bulk density and tamped bulk density are determined according to DIN-53194.

Thin films obtained from the polymer showed many unmelted particles.

TABLE 1

| RECYCLE RATIO 4–5 | | | |
|---|---|---|---|
| | | 1st STAGE | 2nd STAGE |
| Temperature | (°C.) | 60 | 95 |
| Pressure | (MPa) | 2.0 | 1.8 |
| Propane | (% mol) | 58.7 | 28.85 |
| Ethylene | (% mol) | 38.15 | 41.35 |
| Hydrogen | (% mol) | 2.15 | 29.8 |
| CHARACTERISTICS OF THE FINAL PRODUCT | | | |
| Poured bulk density (g/cm³) | | | 0.436 |
| Tamped bulk density (g/cm³) | | | 0.463 |
| Melt Index "E" | | | 0.15 |
| Melt Flow Ratio "F/E" | | | 70.7 |

TABLE 2

| | | 1st STAGE | 2nd STAGE |
|---|---|---|---|
| Temperature | (°C.) | 70 | 75 |
| Pressure | (MPa) | 1.2 | 2.3 |
| Propane | (% mol) | 89.4 | 57.6 |
| Ethylene | (% mol) | 6.6 | 20.3 |
| Hydrogen | (% mol) | 0.38 | 19 |
| CHARACTERISTICS OF THE FINAL PRODUCT | | | |
| Melt Index "E" | | | 0.12 |
| Melt Flow Ratio "F/E" | | | 56 |

Example 2

High density polyethylene (HDPE) was in prepared a continuously operating pilot plant, analogous to the apparatus of FIG. 3 and comprising a catalyst activation reactor and a loop reactor where the prepolymerization was carried out.

The solid catalyst component was prepared according to the above indicated procedure, using an $MgCl_2$-ethanol adduct containing 35% by weight of alcohol. The solid component, an aluminum triethyl (TEAL) solution in n-hexane, dicyclohexyldimethoxysilane (DCPMS) as the electron donor (ED) and propane as the inert medium were fed to the activation reactor kept at a constant temperature of 15° C. The amounts fed were such that the TEAL/ED weight ratio was 18 and the TEAL/Ti molar ratio was 330. To the activation reactor propane was also fed as the inert medium.

After an average residence time of about 6 minutes, the product was discharged and fed to a loop prepolymerizer, maintained at a temperature of 25° C., to which also a certain amount of liquid propylene and propane (as the inert medium) were fed. The average residence time in the prepolymerizer was of about 70 minutes.

The fluid contained in the prepolymerizer was in the liquid state. The liquid propylene was practically completely transformed into solid polypropylene. The residual amount of propylene discharged with the polymer from the prepolymerizer was flash separated, in order to have a negligible amount of propylene fed to the gas-phase reactor.

The fluidized bed reactor which receives the prepolymer produced in the preceding stage operates at a temperature of 60° C. and under a reaction pressure maintained at 2 MPa.

The fresh gas feed to the gas-phase reactors consisted of ethylene, hydrogen as the molecular weight regulator and propane. The amounts fed were such as to give the gas phase concentrations indicated in Table 3, which reports the main operating conditions of the plant and the characteristics of the polymer produced. Melt Index "E" and Melt Flow ratio "F/E" are determined on the product obtained after extrusion and pelletization.

From the polymer obtained from the process, thin films free of unmelted particles have been prepared. This result is particularly interesting and significant if it is considered that the catalyst used in the example produces narrow MWD polymers, which exacerbates polymer homogeneity problems.

TABLE 3

| RECYCLE RATIO 4-5 | | | |
| --- | --- | --- | --- |
| | | 1st STAGE | 2nd STAGE |
| Temperature | (°C.) | 95 | 60 |
| Pressure | (MPa) | 2.0 | 2.0 |
| Propane | (% mol) | 28.85 | 58.7 |
| Ethylene | (% mol) | 41.35 | 38.15 |
| Hydrogen | (% mol) | 29.8 | 2.15 |
| CHARACTERISTICS OF THE FINAL PRODUCT | | | |
| Melt Index "E" | | | 0.15 |
| Melt Flow Ratio "F/E" | | | 70.7 |

We claim:

1. An apparatus for the gas-phase polymerization of olefins $CH_2$=CHR, wherein R is hydrogen or an alkyl radical having 1–12 carbon atoms, comprising two fluidized bed gas-phase reactors (101 and 102) connected by means of transfer pipes (116 and 126) and provided with catalyst (110) and olefin (114 and 124) feeding systems and with gas recycle lines (112 and 122) comprising gas cooling (113 and 123) and compression (111 and 121) systems, wherein at least one (101) of the two reactors is provided with a discharge device comprising a standpipe (115) having a top end located inside the fluidized bed of the reactor (101), a bottom end connected to one (116) of the transfer pipes, and a descending section, said standpipe (115) being provided with a first valve (135) for regulating the circulation flow rate to which a gas stream is sent by means of a second valve (132), and with a third valve (131) for introducing the wash gas, and said transfer pipe (116) having an outlet into the reactor (102) and being provided with a fourth valve (133) for introducing a second gas stream located between said first valve (135) and the outlet of the transfer pipe (116) into the reactor (102).

2. The apparatus of claim 1, wherein the top end of the standpipe (115) is located in the centre of a gas distribution grid (138) and further wherein said first valve (135) is an L-valve.

3. The apparatus of claim 2, wherein the gas recycle line (122) of the reactor (102) is connected to said second, third and fourth valve (131, 132 and 133).

4. The apparatus of claim 3, which comprises a gas condensation system (140) fed by the gas recycle line (112) of the reactor (101), said condensation system (140) being connected by means of a fifth metering valve (136) to the transfer pipe (116) at a point between said fourth valve (133) and the outlet of said transfer pipe (116) into the reactor (102) and being connected to the gas recycle line of the reactor (101) at a point downstream of the cooler (113).

5. The apparatus of claim 1, wherein the reactor (102) is provided with a discharge device comprising a standpipe (125) having a top end located inside the fluidized bed of the reactor (102) and a bottom end connected to one (126) of said transfer pipes, said standpipe (125) being provided with a valve (134) for regulating the circulation flow rate, and said transfer pipe (126) having an outlet into the reactor (101) and being provided with a valve (137) for introducing a gas stream located between said valve (134) for regulating the flow rate and the outlet of said transfer pipe (126) into the reactor (101).

6. The apparatus of claim 5, wherein the gas recycle line (112) of the reactor (101) is connected to the valve (137).

7. An apparatus for the gas-phase polymerization of olefins $CH_2$=CHR, wherein R is hydrogen or an alkyl radical having 1–12 carbon atoms, comprising two gas-phase reactors (105, 106) connected by transfer pipes (156 and 166) and provided with catalyst (159) and olefin (154 and 164) feeding systems and with gas recycle lines (152 and 162) and gas compression (151 and 161) and cooling (153 and 163) systems, wherein one (105) of the two reactors is a fluidized bed reactor whilst the other (106) is a tubular reactor having a top and a bottom wherein turbulent fluidized bed conditions are maintained, said fluidized bed reactor (105) being provided with a discharge device comprising a standpipe (155) having a top end located inside the fluidized bed of the reactor (105), a bottom end connected to the transfer pipe (156) and a descending section, said standpipe (155) being provided with a first valve (175) for regulating the circulation flow rate to which a gas stream is sent by means of a second valve (172), and with a third valve (171) for introducing the wash gas, said transfer pipe (156) having an outlet into the bottom of said tubular reactor (106) and being provided with a fourth valve (173) for introducing a second gas stream located between said first valve (175) and the outlet of said transfer pipe (156) into the bottom of said tubular reactor (106), the top of said tubular reactor (106) being connected to a solid/gas separator (165), and said solid/gas separator being connected to said gas recycle line (162) of said tubular reactor (106) and to said transfer pipe (166) which leads to said fluidized bed reactor (105).

8. The apparatus of claim 7, wherein the top end of said standpipe (155) is located in the centre of a gas distribution grid (177), further wherein said first-valve (175) is an L-valve, and further wherein said solid/gas separator (165) is of a cyclone type.

9. The apparatus of claim 8, wherein said gas recycle line (162) of said tubular reactor (106) is connected to said second, third and fourth valves (171, 172 and 173).

10. The apparatus of claim 9, which comprises a gas condensation system (180) fed by said gas recycle line (152) of the fluidized bed reactor (105), said condensation system (180) being connected to the transfer pipe (156) by means of a fifth metering valve (176) at a point between said fourth valve (173) and the outlet of said transfer pipe (156) into the tubular reactor (106) and being connected to the gas recycle line of the reactor (105) at a point downstream of the cooler (153).

* * * * *